(12) United States Patent
Naimer et al.

(10) Patent No.: US 8,378,852 B2
(45) Date of Patent: Feb. 19, 2013

(54) AIRCRAFT-CENTERED GROUND MANEUVERING MONITORING AND ALERTING SYSTEM

(75) Inventors: Joachim Laurenz Naimer, Ascona (CH); Frank Hummel, Woodinville, WA (US); David Zeitouni, Redmond, WA (US); Patrick Krohn, Bellevue, WA (US)

(73) Assignee: Universal Avionics Systems Corp., Tucson, AZ (US)

( * ) Notice: Subject to any disclaimer, the term of this patent is extended or adjusted under 35 U.S.C. 154(b) by 683 days.

(21) Appl. No.: 12/236,208

(22) Filed: Sep. 23, 2008

(65) Prior Publication Data

US 2009/0115637 A1   May 7, 2009

Related U.S. Application Data

(63) Continuation-in-part of application No. 11/634,663, filed on Dec. 6, 2006.

(51) Int. Cl.
*G01C 23/00* (2006.01)
(52) U.S. Cl. .......................... 340/945; 340/500
(58) Field of Classification Search .................. 340/945, 340/952, 963, 961, 964, 967, 970, 500
See application file for complete search history.

(56) References Cited

U.S. PATENT DOCUMENTS

| | | | |
|---|---|---|---|
| 5,200,902 A | | 4/1993 | Pilley |
| 5,629,692 A * | | 5/1997 | Stayton et al. ............... 340/961 |
| 5,740,047 A | | 4/1998 | Pilley et al. |
| 6,219,618 B1 | | 4/2001 | Bateman |
| 6,538,581 B2 | | 3/2003 | Cowle |
| 6,606,563 B2 * | | 8/2003 | Corcoran, III ............... 701/301 |
| 6,614,397 B2 * | | 9/2003 | Pullen et al. .................. 342/456 |
| 6,683,563 B2 * | | 1/2004 | Lee et al. ................. 342/357.02 |
| 6,795,772 B2 * | | 9/2004 | Lin et al. ....................... 701/301 |
| 6,983,206 B2 | | 1/2006 | Conner et al. |
| 7,117,089 B2 | | 10/2006 | Khatwa et al. |
| 7,206,698 B2 | | 4/2007 | Conner et al. |
| 7,630,829 B2 * | | 12/2009 | Pepitone ....................... 701/120 |
| 2004/0006412 A1 * | | 1/2004 | Doose et al. ................... 701/10 |
| 2004/0225440 A1 * | | 11/2004 | Khatwa et al. ............... 701/301 |
| 2005/0015202 A1 | | 1/2005 | Poe et al. |
| 2005/0128129 A1 | | 6/2005 | Conner et al. |

(Continued)

FOREIGN PATENT DOCUMENTS

| | | |
|---|---|---|
| EP | 0744630 A2 | 11/1996 |
| EP | 0756153 A2 | 1/1997 |
| WO | 97/47946 | 12/1997 |
| WO | 00/16230 | 3/2000 |

(Continued)

*Primary Examiner* — George Bugg
*Assistant Examiner* — Edny Labbees
(74) *Attorney, Agent, or Firm* — Quarles & Brady LLP; George E. Haas

(57) ABSTRACT

A monitoring system for alerting operators of aircraft or other vehicles when they are approaching a geographical feature of interest, such as a runway, taxiway or other aircraft. The system includes a database having at least one geo-referenced chart, a processor, a positioning system configured to identify a number of aircraft or other vehicle operational parameters and transmit that data to the processor, and a display unit configured to display the present position of the aircraft on the geo-referenced chart. After receiving the operational parameters, the processor identifies a virtual containment zone centered about the aircraft or vehicle. The processor further monitors the position of the aircraft or other vehicle relative to any geographical features of interest and determines whether at least a portion of a geographical feature is located within the containment area. If such a condition is detected, a notification is generated and presented to the operator who may respond accordingly.

26 Claims, 10 Drawing Sheets

U.S. PATENT DOCUMENTS

2005/0151681 A1 7/2005 Conner et al.
2005/0192738 A1 9/2005 Conner et al.
2007/0078591 A1* 4/2007 Meunier et al. ............... 701/120

FOREIGN PATENT DOCUMENTS

WO 00/57202 9/2000

* cited by examiner

AIRCRAFT-CENTERED GROUND MANEUVERING MONITORING AND ALERTING SYSTEM

CROSS-REFERENCE TO RELATED APPLICATIONS

This application is a continuation-in-part of U.S. patent application Ser. No. 11/634,663 filed Dec. 6, 2006, the entirety of which is hereby incorporated by reference.

STATEMENT REGARDING FEDERALLY SPONSORED RESEARCH OR DEVELOPMENT

Not Applicable.

BACKGROUND OF THE INVENTION

1. Field of the Invention

The present invention relates to an improved system for alerting operators of aircraft during ground operations that the aircraft is approaching a runway or other designated area.

2. The Prior Art

Within the aviation industry, a serious concern exists regarding the unauthorized entry of aircraft onto airport runways during taxiing operations, which is commonly referred to as a "runway incursion." This concern has recently been heightened by a number of recent incidents involving "near-misses" occurring when two aircraft have attempted to use the same runway or intersecting runways at the same time, resulting in the potential for a disastrous collision. In another recent incident, a commercial aircraft crashed during takeoff, due to the fact that the pilot had attempted to take off from the wrong runway, which was shorter than the minimum required take-off distance for the aircraft.

Various systems have been used in the past in order to minimize the potential for runway incursions. A number of "traditional" systems are described in U.S. Pat. No. 6,606,563, which have primarily relied on the pilot and/or air traffic controller to monitor the position of the aircraft relative to airport runways during taxiing operations. These systems have included requiring a pilot to request permission from an air traffic controller before taxiing across a runway, relying on air traffic controllers to visually monitor the movement of aircraft while taxiing, and placing signs and markings on the ground to indicate the position of an aircraft relative to a given runway. However, such systems are not well suited to prevent runway incursions at many of today's larger airports, which include many runways and taxiways where dozens of aircraft may be taxiing, taking off or landing at any given time. Moreover, such systems are less reliable at night or during low-visibility conditions, when the ability of pilots and air traffic controllers to monitor conditions visually is diminished.

U.S. Pat. No. 6,606,563 discloses a system for alerting an operator of a vehicle, such as an aircraft, that the vehicle is approaching or within a zone of awareness, such as a runway. The system includes an electronic database which stores the location of the zone of awareness, a positioning system (e.g., GPS) which determines the location of the aircraft, a processor which calculates the distance between the vehicle location and the zone of awareness, and an alarm that alerts the pilot when the distance is less than a predetermined value. All of these components are located on the aircraft itself, so that the system need not rely on input from outside sources, for example air traffic control systems, in order to warn the pilot of a potential runway incursion.

The storage device of this system comprises a conventional computer memory device (e.g., RAM, CD-ROM, EPROM), in which is stored a database including location information for any desired number of zones of awareness. The zones of awareness may include all or part of a runway, and may additionally include any other area for which an alert would be desirable if approached by an aircraft (e.g., construction zone). The coordinates for each zone of awareness may be determined relative to the surface of the earth, e.g., longitude and latitude.

The alarm function is disclosed as including either audible and/or visual components. The audible alarm may include a synthesized voice warning identifying the name of the runway (e.g., "ENTERING RUNWAY 27") and/or the location of the aircraft relative to the runway (e.g., "RUNWAY AHEAD"). The visual component of the alarm may include a designation of a feature within the zone of awareness, such as the word "RUNWAY" displayed on a screen, an identification of a specific runway (e.g., "RUNWAY 27") on a screen, and/or other information such as a map of the airport showing the location of various geographical features.

While the alerting system disclosed by U.S. Pat. No. 6,606,563 provides pilots with some notification of potential runway incursions, as described above, that system does not teach the use of a conventional electronic airport chart to display a graphical depiction of the present position of an aircraft, relative to the runway of interest and other geographical features of the airport. Thus, while the pilot may understand that he is approaching a runway, he may not immediately realize where the runway is located relative to his aircraft or which way he should proceed to avoid entering the runway—particularly if he is operating at an airport with which he is unfamiliar. Moreover, if the pilot has entered a runway different from the runway on which the aircraft has been cleared to take off, he may not be cognizant of that fact based solely on an audible warning or a visual designation such as "RUNWAY appearing on a display screen. Accordingly, it would be desirable to combine a warning that the aircraft is approaching a runway, with a visual notification to the pilot identifying precisely where the aircraft is located relative to various geographical features within the airport, at the time of the notification.

Systems for displaying the position of an aircraft on a display device relative to geographical features at an airport, such as runways, taxiways, terminals, etc., are known in the art. Electronic airport charts, such as those provided by Jeppesen Sanderson, Inc. ("Jeppesen") in association with its JeppView software, are routinely utilized by pilots to obtain a graphical depiction of the position of an aircraft relative to other geographical features of an airport.

Electronic airport charts are typically stored in a computerized database, which is either located on a hard disk drive or a CD-ROM drive connected to an onboard computer system. One such system is the Application Server Unit (ASU) offered by Universal Avionics Systems Corporation ("Universal Avionics). The computer system typically includes a display unit on which the airport charts are displayed, which may comprise either a panel-mounted display unit, such the EFI-890R diagonal flat screen display unit from Universal Avionics, or a portable, standalone display unit, such as the Universal Cockpit Display Terminal (UCDT) from Universal Avionics. Typically, such systems are able to utilize avionics data obtained from the aircraft's flight management system (FMS), including position, heading, track and velocity data, to provide a graphical depiction of the aircraft's present position and heading on the airport chart display.

Alternatively, the database may comprise part of a portable, standalone computer system, such as an electronic flight bag (EFB) system, which may or may not be integrated with the aircraft's avionics systems. One such EFB system is the Universal Cockpit Display (UCD) system, from Universal Avionics, which comprises a Universal Cockpit Display Computer and one or more UCDT display units. Such a system can provide the flight crew with a variety of information such as checklists, airport and aeronautical charts, external video displays, electronic documents and weather data. However, EFB systems, and particularly those systems which are not capable of receiving data from the aircraft's avionics systems, have limited capability of notifying the flight crew of potential runway incursions, as they typically have limited or no capability of obtaining data regarding the aircraft's position and velocity, for display on an airport charts stored within the database.

Standard airport charts, while useful for providing general position information, were previously limited by the fact that positional coordinates on the charts were not indexed to a fixed global reference frame, such as the WGS 84, which is the reference system used by the Global Positioning System (GPS). As a result, such charts were likely to generate significant error between the actual position of the aircraft relative to airport geographical features, as determined by GPS, and the aircraft position displayed on the airport chart, because the positional coordinates on those charts were not based on WGS 84. The difference between the true position of the aircraft and the position displayed on a standard electronic airport chart could potentially total tens or hundreds of meters. Thus, such charts were simply not capable of displaying the position of an aircraft with sufficient accuracy to identify potential runway incursions.

In recent years, providers of airport charts, such as Jeppesen, have solved this problem by providing "geo-referenced" airport charts, in which each coordinate on the chart is indexed to a particular geographical location having a specific latitude and longitude, as determined relative to a fixed global reference frame such as the WGS 84. As a result, a position of an aircraft determined using GPS can be displayed on a geo-referenced airport chart with an accuracy unobtainable using standard, non-geo-referenced airport charts.

However, in order to realize the significant advantages afforded by the use of geo-referenced airport charts, it is important that the system include some method for monitoring and identifying inconsistencies between the source data (which includes both the stored airport geographical feature data as well as dynamic aircraft position and orientation data) and the graphical presentation of that data on the aircraft display device. Without providing such a monitoring feature in association with the use of geo-referenced airport charts, the runway, taxiway, aircraft position or other airport element could be incorrectly drawn on the display, without the pilot being aware of such an error. This could result in either a false notifications of a potential runway incursion, or a failure to notify the pilot of an actual potential runway incursion.

Another system for alerting pilots of potential runway incursions is the surface area movement management (SAMM) software system provided by Aviation Communication & Surveillance Systems (ACSS). The SAMM system provides pilots with warnings of potential runway incursions, by monitoring position signals received from other aircraft engaging in taxiing, takeoff or landing operations at the same airport, such as ADS-B transmissions and mode-S transponders. Based on such information, the SAMM system can provide pilots with a warning if another aircraft enters the same runway during a takeoff operation. For example, is an airplane equipped with SAMM were to start its takeoff roll just as another aircraft equipped with ADS-B or a mode-S transponder taxied onto the active runway, the cockpit display in the SAMM-equipped aircraft would immediately draw a red box around the active runway, highlight the threat aircraft in red, and provide an aural alert.

However, while the SAMM system is capable of warning a pilot of potential incursions by other aircraft onto a runway being used by his aircraft, and highlighting the position of both aircraft on an electronic airport chart, it does not provide the pilot with any notification prior to his own aircraft entering onto the runway in the first place. Thus, a pilot who has entered the wrong runway prior to takeoff would not be provided with a notification of which runway the aircraft has entered, prior to his attempting to take off.

While systems such as those disclosed above are capable of alerting pilots to potential runway incursions under certain circumstances, they each have significant limitations. Thus, it would be desirable to provide a system for notifying a pilot that his aircraft is approaching a runway or other geographical feature of interest, while simultaneously identifying the position of the aircraft relative to a geo-referenced airport chart. This would ensure that the pilot was not only made aware that his aircraft would enter a runway if it continues on its current path, but also enable the pilot to immediately assess the location of his aircraft relative to other airport features. This would likewise minimize the possibility of a pilot attempting to take off from the wrong runway, by enabling the pilot to visually confirm from the airport chart display that the aircraft is indeed on the correct runway—particularly at night or during periods of low visibility when runway markings, lights, etc., may be insufficient for that purpose.

It would likewise be desirable to provide a method of notifying a pilot that his aircraft is approaching a runway or other feature of interest, in which the notification includes both a visual notification associated with a geo-referenced airport chart, and an audible notification identifying the runway or feature of interest. Still further, it would be desirable to provide a method of basing the timing of the notifications to the speed of the aircraft. This would ensure that regardless of aircraft speed, the aircraft operator always has sufficient time and distance to respond to an alert.

It would further be desirable to provide such a method which further includes monitoring and notifying the pilot of any errors or inconsistencies between source data (either stored airport data or dynamic aircraft position orientation data) and the graphical presentation of that data on an aircraft display device.

SUMMARY OF THE INVENTION

One aspect of the present invention is a monitoring system that notifies an operator, such as an airplane or helicopter pilot, that an aircraft is approaching a geographical feature of interest, such as a runway, taxiway, intersection, helipad or another aircraft. The monitoring system includes a database having geo-referenced airport charts for a number of airports and information on at least one geographical feature of interest for each airport. The monitoring system further includes a processor, a positioning system configured to determine the position, heading, track and/or velocity of the aircraft and transmit that data to the processor, and a display unit configured to display the geo-referenced airport chart, the present position of the aircraft and at least one geographical feature of interest on the geo-referenced airport chart.

After receiving the aircraft position, heading, track and/or velocity information from the positioning system, the processor defines a containment area including the aircraft and a surrounding area. In one preferred embodiment the containment area is generally circular in shape and centered about the aircraft. In another possible embodiment, the containment area is segmented into an inner containment area and an outer containment area. The processor determines whether a geographical feature of interest is at least partially located within the containment area associated with the aircraft. This could occur, for example, if an aircraft is taxing towards a runway. At some point, the containment area encompassing the aircraft will also include at least a portion of the runway. In other words, the containment area will overlap with at least a portion of the runway.

After determining that the geographical feature of interest is at least partially located within the containment area, the processor initiates a notification procedure and transmits a notification signal to the display unit and/or to an audible annunciator, e.g., a speaker. If the signal is transmitted to the display unit, a visible notification is displayed on the display unit. The visible notification may include a change in display of the geographical feature on the airport chart. In alternative embodiments, the notification may include a textual or vocal identification of the relevant geographical feature.

Alternatively, the geographical feature may be highlighted and/or flashed on the display unit. The notification ceases after the aircraft moves away from the geographical feature such that the feature is no longer at least partially located within the containment area. The notification also ceases if the aircraft is traveling parallel to the geographic feature for a predetermined distance or time. The monitoring system may further include a user input to disable the notification. After disabling the notification and after the geographic feature is no longer at least partially located within the containment area, the processor may reset such that a new notification signal is transmitted if the same or different geographical feature becomes at least partially located within the containment area.

Another aspect of the present invention is a monitoring system that notifies an operator such as an airplane pilot that an aircraft is approaching a geographical area of interest. The monitoring system of this embodiment comprises a database including geo-referenced airport charts, a processor, a positioning system configured to determine the position, heading and/or velocity of the aircraft, and transmit that data to the processor, and a display unit configured to display a geo-referenced chart and the present position of the aircraft relative to the geo-referenced chart. The monitoring system is further connected to a flight management system in which the intended departure runway may be selected.

The processor receives the position, heading and/or velocity data from the positioning system, defines a containment area about the aircraft, and then determines whether a geographical area of interest is at least partially located within the containment area associated with the aircraft. Upon determining that a geographical area of interest is at least partially located within the containment area, the processor initiates and transmits a notification signal to the display unit, causing a visible notification to be displayed on the display unit. The visible notification may comprise a change in display of a geographical feature on the geo-referenced chart. The visible notification may also comprise an identification of a geographical feature located at least partially within the containment area.

The processor further receives the intended departure runway information from the flight management system and causes the display unit to identify the intended departure runway as such. Additionally, the processor receives fuel flow information from the flight management system. A notification signal is generated and transmitted to the display unit if the measured fuel flow is greater than or equal to the amount of fuel necessary for aircraft takeoff and the aircraft is not on the intended departure runway.

Still another aspect of the present invention is a method of notifying an operator that an aircraft is approaching a geographical feature of interest, such as a runway. The method includes retrieving geo-referenced airport chart data and containment area data from a database, displaying the geo-referenced airport chart on a display unit, determining the position, heading, track and/or velocity of the aircraft, transmitting data corresponding to the position, heading, track and/or velocity of the aircraft to a processor, displaying visual indicia corresponding to the position, heading, track and/or velocity of the aircraft overlaid on the geo-referenced airport chart, determining whether a geographical feature is at least partially located within the containment area, and upon determining that a geographical feature of interest is at least partially located within the containment area, providing either a visible or audible notification to the operator.

The visible notification may comprise a change in display of a geographical feature on the geo-referenced airport chart. The visible notification may also comprise an identification of a geographical feature at least partially located within the containment area.

Various other aspects of the present invention will be made apparent from the following detailed description of the drawings.

DETAILED DESCRIPTION OF THE INVENTION

Figure 1:
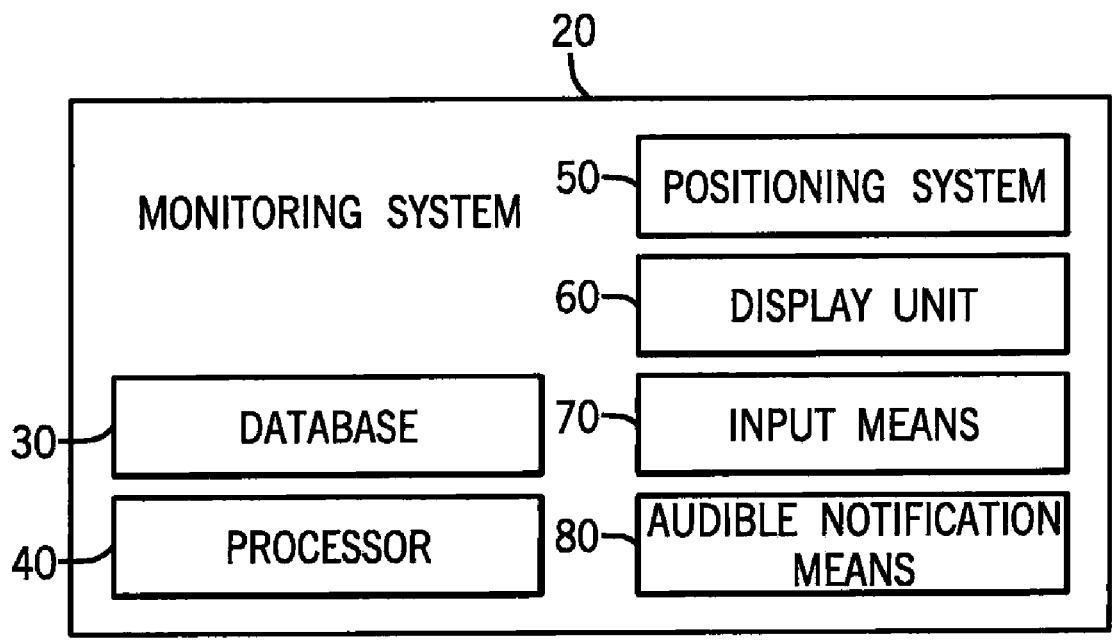
FIG. 1 is a block diagram illustrating the components of a preferred embodiment of the aircraft ground maneuvering monitoring system of the invention.

While this invention is susceptible of embodiment in many different forms, there is shown in the drawings and will herein be described in detail, several preferred embodiments, with the understanding that the present disclosure should be considered as an exemplification of the principles of the invention and is not intended to limit the invention to the embodiments so illustrated.

While the term "pilot" is used for the sake of simplicity, it should be understood that, in the context of the invention, "pilot" refers to any member of an aircraft flight crew capable of receiving notifications regarding the state of the aircraft. Similarly, the term "operator" refers to any user of a monitoring system constructed in accordance with an aspect of the present invention.

Referring to FIG. 1, one embodiment of an aircraft ground maneuvering monitoring system 20 is shown. The monitoring system generally comprises a database 30, a processor 40, a positioning system 50, a display unit 60, an input means 70 and an audible annunciator 80. Some or all components of the monitoring system 20 may be included within existing computer systems previously installed on an aircraft and integrated with the aircraft's avionics systems, such as the Application Server Unit (ASU) from Universal Avionics Systems Corporation ("Universal Avionics"). Alternatively, the monitoring system 20 may comprise a standalone unit, such as an electronic flight bag (EFB) unit, which is fully portable, but is capable of obtaining avionics data from the aircraft's flight management system (FMS).

Figure 2:
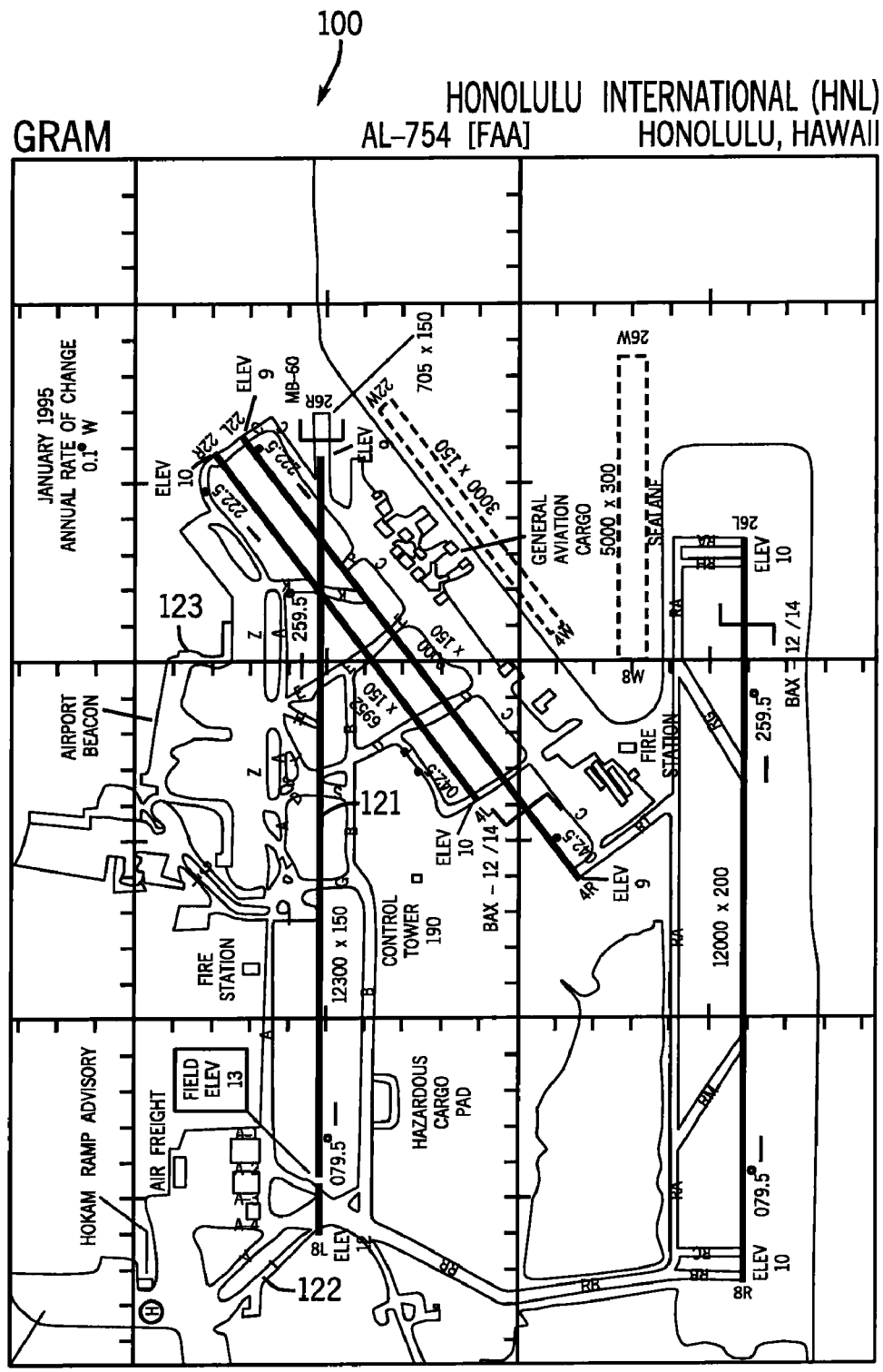
FIG. 2 is a representation of a conventional airport chart, indicating the positioning of runways, taxiways, terminals and other geographical features.

The database 30 is comprised of a conventional computer data storage component, such as solid-state random access memory (RAM), CD-ROM, hard disk drive, or the like. Database 30 is used to store chart data for electronic airport charts, such as those provided within Jeppesen's JeppView software program. A conventional electronic airport chart 100 is shown in FIG. 2, and includes at least one runway 121, a taxiway 122, and a terminal 123, among other geographical features. The electronic airport charts contained within the database 30 are preferably geo-referenced, as previously described. Database 30 further includes data identifying one or more containment areas 124 associated with each airport chart 100, which are further described below with reference to FIGS. 3 and 4.

Processor 40 comprises a conventional computer processing component capable of performing mathematical operations and manipulating data, such as the Pentium® series of processors from Intel, Inc.

Positioning system 50 preferably comprises a conventional flight management system (FMS), which utilizes global positioning system (GPS) and inertial reference system (IRS) data, to instantaneously determine the location (latitude and longitude), heading, track and velocity of the aircraft. Such flight management systems are well known in the art. Positioning system 50 may likewise comprise any other system(s) known in the art for determining the position, heading, track and velocity of an aircraft, and may further utilize an augmentation system, such as a wide area augmentation system (WAAS), in order to determine the position of the aircraft with increased accuracy.

Display unit 60 preferably comprises a conventional computer display screen, such as a cathode ray tube (CRT) or a liquid crystal display (LCD). Examples of display units which are well suited for use in the monitoring system 20 include panel-mounted display units, such the EFI-890R diagonal flat screen display unit from Universal Avionics, and portable, standalone display units, such as the UCDT, also from Universal Avionics.

Input means 70 may comprise any conventional computer input device, such as a keyboard, mouse, voice recognition unit, touch screen, or any combination of the above.

Audible annunciator 80 may comprise any conventional means of providing an audible notification or warning, including a speaker, bell, buzzer, horn, or other sound-producing device. The notification provided by the audible annunciator 80 may take the form of any conventional alarm tone, or alternatively may produce a synthesized voice warning. In the latter case, the notification may include an identification of a feature located within the containment area being approached by the aircraft, for example, "APPROACHING RUNWAY 27".

In accordance with one embodiment of the present invention, the operation of monitoring system 20 is illustrated by reference to FIGS. 3, 4 and 5. As shown in FIG. 5, the monitoring system 20 first retrieves the relevant geo-referenced airport chart from the database 30, together with data which identifies the location of one or more containment areas 124 on the chart 100. The geo-referenced airport chart 100 is then displayed on the display unit 60, together with a pictorial representation of the aircraft 120 identifying the location of the aircraft 120 relative to other geographical features.

Figure 3:
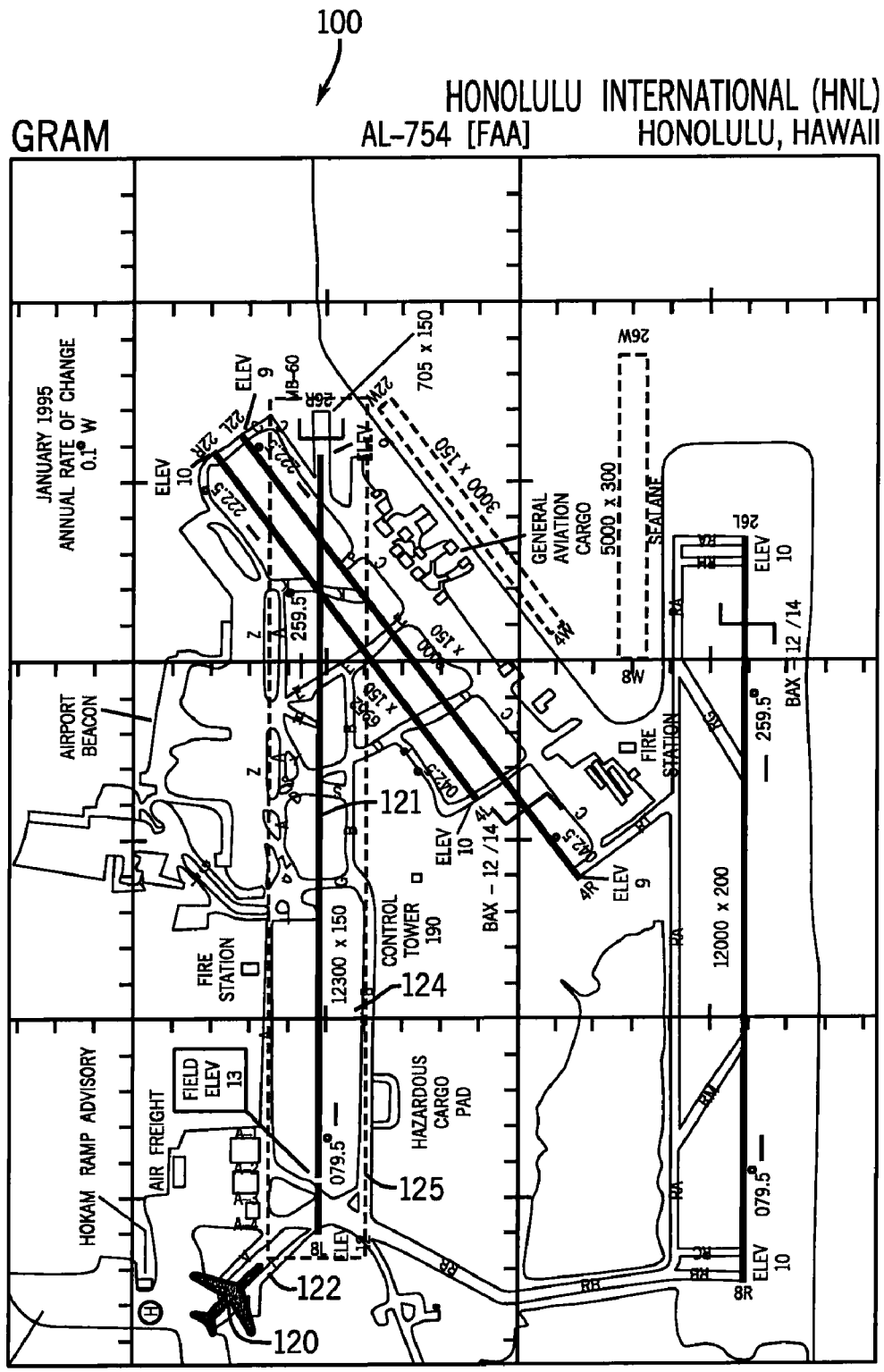
FIG. 3 is the airport chart of FIG. 2, showing the position of an aircraft during a taxiing operation and a containment area according to one aspect of the present invention.

In FIG. 3, a pictorial representation of aircraft 120 is shown on the geo-referenced airport chart 100, as being located on taxiway 122, heading toward runway 121 (designated on airport chart 100 as Runway 8L). Aircraft 120 is shown at a much larger scale than runway 121 and taxiway 122, in order to enhance the pilot's ability to ascertain the position of aircraft 120 (which is in reality smaller than the width of either) relative to the various geographical features of the airport, such as runway 121 and taxiway 122.

Because the database 30 contains geo-referenced airport chart data, both the airport data and the aircraft position data necessarily utilize the same datum (e.g., WGS 84). The airport data and aircraft position data are processed by the processor 40 to create a geo-referenced graphical presentation of the airport chart 100. It is desirable to continually monitor the integrity of the graphical display, to ensure that the airport, including runways 121, and aircraft 120 are accurately displayed in the correct geo-referenced location and orientation relative to each other.

As shown in FIG. 5, the processor 40 is preferably programmed to monitor and identify any errors or inconsistencies between the source data (including airport geographical feature data stored in database 30 and dynamic aircraft position and orientation data obtained from positioning system 50) and the graphical presentation of that data on display unit 60. Before a graphical element (e.g., runway 121 or aircraft 120) is presented on the display screen, the algorithm verifies that the element's location and orientation have been computed properly, and that the element has been drawn in the proper location and orientation on the display screen relative to other elements. Such a monitoring functionality is provided in the aforementioned Universal Cockpit Display and Application Server Unit products available from Universal Avionics.

Errors or inconsistencies between the position of the graphical elements drawn on the display screen and the actual position of those elements as identified from the underlying source data can potentially arise due to, for example, errors in the underlying source data itself (e.g., the database identifies the position of a runway 121 in the wrong location) or incompatibility between the graphics software used to draw the elements and the display unit hardware. If processor 40 identifies any such errors, a notification is preferably provided to the pilot.

For example, if the airport chart data cannot be properly computed by processor 40, airport chart 100 will not be displayed on display unit 60, and the notification may comprise an error message displayed on display unit screen. If an error is detected in association with the display of a single graphical element, such as the position of the runway 121, the notification may comprise displaying that graphical element on display unit 60 in another color (e.g., yellow), to notify the pilot that the position of the potential error between the displayed position of the aircraft 120 and that of the displayed graphical element.

Also shown in FIG. 3 is a containment area 124, which may also be displayed on airport chart 100, if desired, although the invention does not require that a pictorial representation of the containment area 124 itself be displayed. Containment area 124 may comprise a fixed area surrounding a runway 121 or other desired geographical feature, and is bounded by a boundary 125. In the example shown, containment area 124 comprises a rectangular area which extends a specified distance (e.g., 100 meters) beyond the end and side boundaries of the runway 121. Alternatively, the containment area 124 may comprise any other desired fixed area(s). For instance, smaller, individual containment areas 124 may be located at each intersection between a runway 121 and a taxiway 122, or a containment area 124 may extend along portions or the entirety of both a runway 121 and a taxiway 122.

Of course, each containment area 124 is not to be limited to a rectangular configuration, and may take any desired size or shape, depending on the specific geographical feature for which a notification is desired, such as a construction area or military area, to name but a few.

Alternatively, the configuration of the containment area 124 may vary depending on various aircraft operational information such as the instantaneous velocity of the aircraft 120. This would enable the monitoring system 20 to provide a notification of a potential runway incursion at least a certain amount of time before aircraft 120 would reach runway 121 at its present velocity. In such a system, the size of the containment area 124 increases or decreases as the velocity of the aircraft 120 increases or decreases, respectively, to assure that the notification is provided to the pilot with sufficient time to change course or stop the aircraft 120 to avoid a runway incursion, if necessary. One such configuration may comprise a rectangular area which extends beyond the boundaries of runway 121 by a distance equal to $v*t$, where v is the instantaneous velocity of aircraft 120 and t is the desired period of time which aircraft 120 would require to reach the entrance to runway 121 at that velocity. For example, if the desired period of time is 15 seconds and aircraft 120 is taxiing at a speed of 15 knots (15 m/s), processor 40 would calculate the containment area 124 at that instant as extending 450 meters beyond the boundaries of the runway 121. As the processor 40 continuously receives instantaneous velocity data from the positioning system 50, the size of containment area 124 increases or decreases, as the velocity of aircraft 120 increases or decreases.

In yet another alternative embodiment, containment area 124 may vary according to operation information such as the velocity of the aircraft 120, as described above, relative to a second, smaller area which extends beyond the boundaries of the runway 121 itself. This embodiment would ensure that, even if the aircraft were traveling very slowly, the pilot would receive notification some distance prior to entering the runway. In such an embodiment, at any given instant containment area 124 would extend beyond the boundaries of runway 121 by a distance equal to $x+(v*t)$, where x equals the minimal distance from the runway at which a notification would be provided. Of course, various modifications to the method of determining the size of the containment area may be made to enable the determination of a containment area having any desired, non-rectangular shape, based in whole or in part on the velocity of the aircraft.

In another alternative embodiment shown in FIGS. 6A-6B, and described in further detail below, a generally circular containment area 224 is generated and centered about the aircraft 120. The containment area 224 is not limited to a circular shape and may be defined by other shapes such as ovals, rectangles, and the like. Further, the location of the containment area 224 in relation to the aircraft 120 may be arranged in alternative manners including, but not limited to, centered about the front of the aircraft 120, encompassing only a portion of the aircraft 120, such as the wings and an area in front of the aircraft 120, and the like. Certain types of vehicles may have containment areas with predetermined sizes and geometries. For instance, a helicopter or a land-based vehicle would generally have, at least initially, a circular containment area as these types of vehicles may move in various radial directions. The containment area for an airplane, although including at least the entire airplane body, may further require additional space in front of the airplane as that is the typical direction of travel.

Referring again to FIGS. 3 and 4, as aircraft 120 approaches runway 121, positioning system 50 continually monitors the instantaneous position, heading, track and/or velocity (horizontal and/or vertical) of aircraft 120, and communicates that data to processor 40. Based on the position, heading, track, and/or velocity data, processor 40 continuously evaluates whether aircraft 120 has entered containment area 124. Depending on the desired method of determining the size of the containment area (as discussed above), any combination of the position, heading, track and/or velocity data may be utilized by processor 40 in determining whether aircraft 120 has entered a containment area 124. Prior to entry of aircraft 120 into containment area 124, monitoring system 20 can be thought of as in a "standby mode", in which monitoring system 20 is continuously monitoring the position of aircraft 120 relative to containment area 124, but has yet to generate any notification to the pilot.

Figure 4:
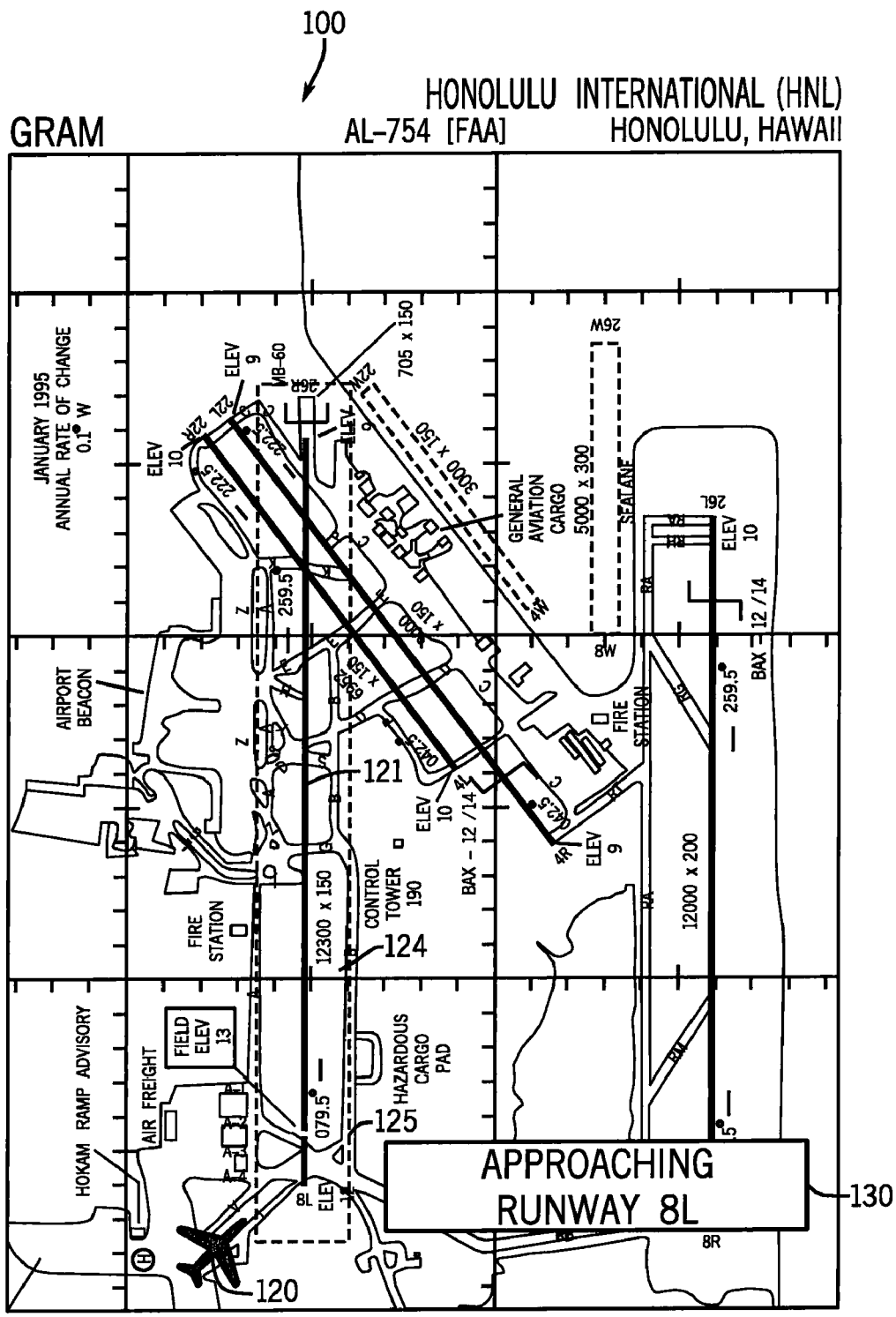
FIG. 4 is the airport chart of FIG. 3, in which a portion of the aircraft has entered the containment area.
Figure 5:
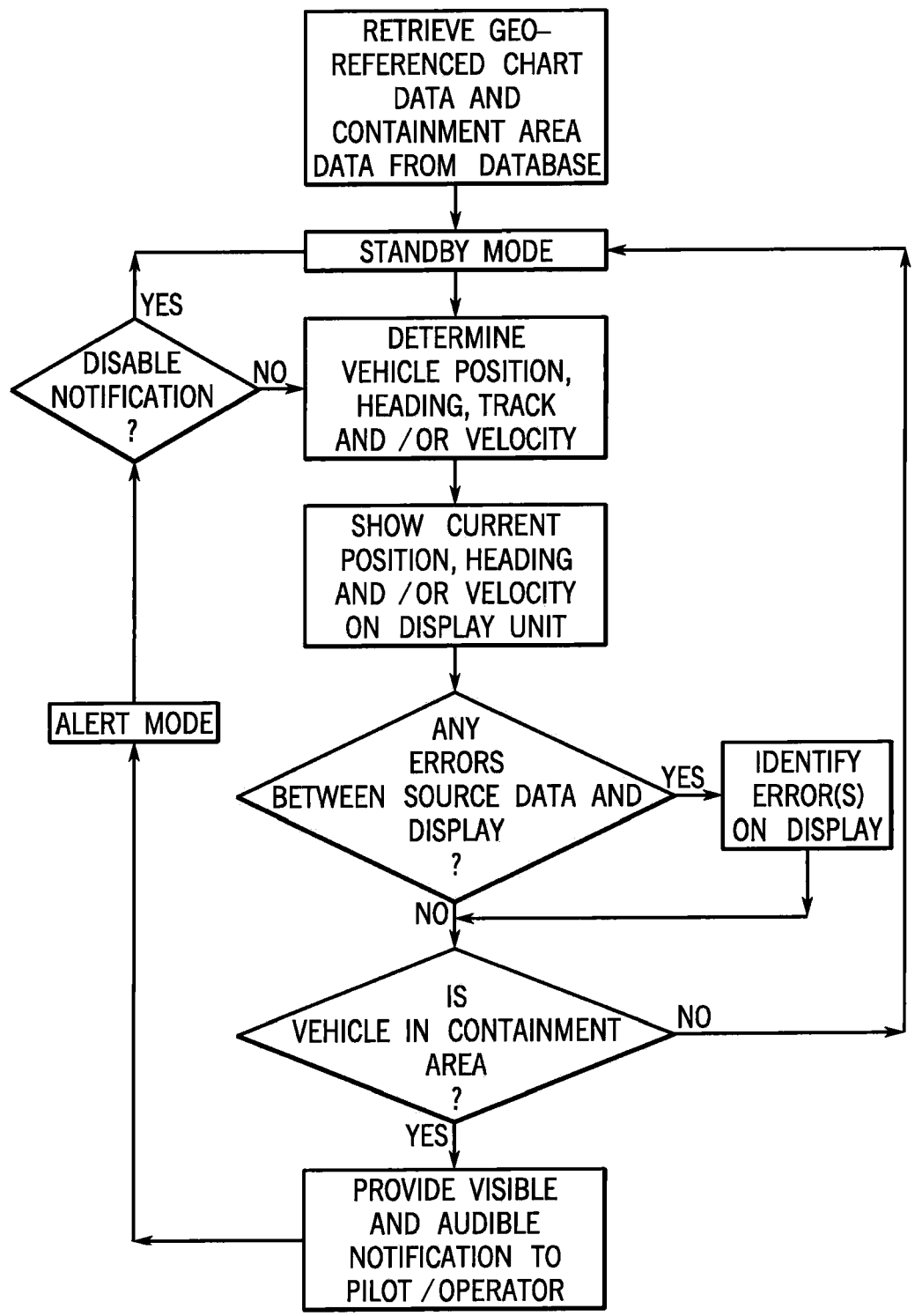
FIG. 5 is a flowchart illustrating features of one method of monitoring potential runway incursions with the containment area of FIG. 3 in accordance with one aspect of the present invention.

When, as shown in FIG. 4, aircraft 120 has reached boundary 125 of containment area 124, processor 40 initiates a notification signal to display unit 60, to provide a visible notification to the pilot that aircraft 120 has entered containment area 124. At this point, monitoring system 20 has entered an "alert mode", in which monitoring system 20 continues to provide a visible notification to display unit 60, until aircraft 120 either exits containment area 124, thereby returning the system to standby mode, or the pilot disables the visible notification as further described below.

The visible notification may consist of a change in the way runway 121 is displayed on geo-referenced airport chart 100, such as changing the color of runway 121 to a color which differs from other features shown on airport chart 100 (e.g., from black to red), causing runway 121 to flash, or a combination of the two. Alternatively, or in addition to the change in the display of runway 121, the visible notification may include other changes to the display of airport chart 100, such as changing the color of the chart background, causing a textual warning 130 identifying the geographic feature associated with the specific containment area 124 (e.g., "APPROACHING RUNWAY 8L") to appear and/or flash on a certain portion of display unit 60, changing the color of aircraft 120, causing aircraft 120 to flash, or a combination of any or all of the above.

In addition to generating a visible notification, upon entering "alert mode," monitoring system 20 may also initiate a notification signal to audible annunciator 80 to generate an audible notification to the pilot, as described above.

After monitoring system 20 has entered the "alert mode", the pilot of aircraft 120 may be permitted to disable either or both of the visible and/or audible notifications, by way of input means 70. Such a feature is particularly desirable where monitoring system 20 includes a repeated or continuous audible notification, which is no longer necessary once the pilot has been notified that aircraft 120 is approaching runway 121. Where input means 70 comprises a touch screen, such as with the Universal Avionics UCDT, there may be provided a location on the touch screen which disables the visible and/or audible notifications when touched. Alternatively, where input means 70 comprises a keyboard, any desired keystroke (e.g., space bar, ESC key, etc.) or combination of keystrokes may disable the visible and/or audible notifications. This feature may be configured so that the pilot may disable the audible notification, but not the visible notification, or vice versa.

Preferably, when a pilot disables the visible and/or audible notifications, those notifications are disabled only with respect to the containment area 124 in which the aircraft 120 is presently located. In that case, monitoring system 20 will return to "standby mode" upon disabling of the visible and/or audible notifications by the pilot, and will once again provide a notification if aircraft 120 leaves and reenters containment area 10 124, or enters a different containment area 124 identified in database 30. Likewise, processor 40 will be programmed so that monitoring system 20 will return to "standby mode" once aircraft 120 exits containment area 124, and will once again provide a notification if aircraft 120 reenters containment area 124 or enters a different containment area 124.

Referring now to FIGS. 1, 6A, 6B, and 7, an alternative aircraft ground maneuvering monitoring system and method is disclosed. The following description should also be viewed in light of the discussion regarding the method of FIG. 5, including certain aspects such as retrieving the relevant georeferenced airport chart data and monitoring for inconsistencies between the source data and the graphical presentation of that data that have already been fully discussed.

Figure 6A:
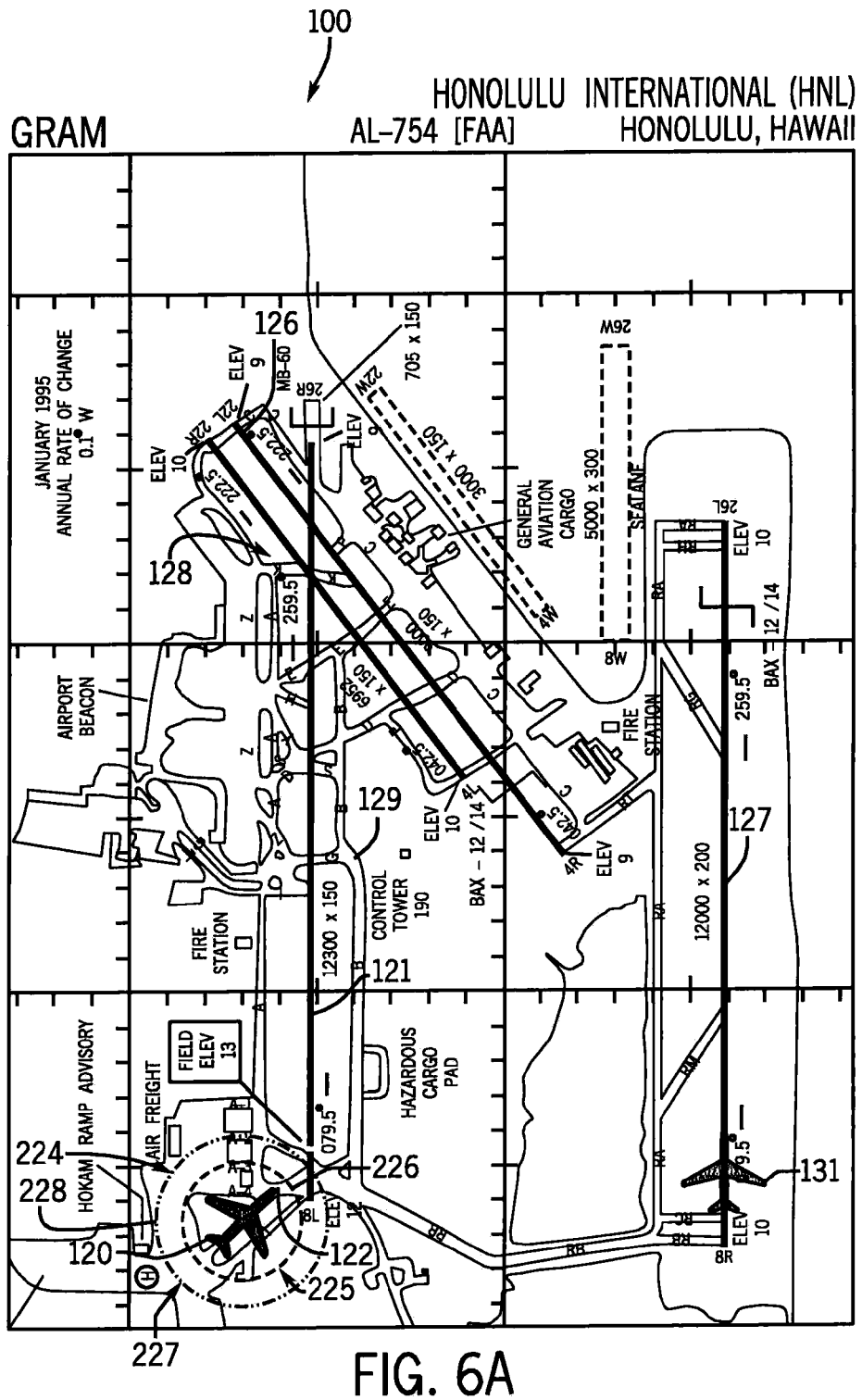
FIG. 6A is the airport chart of FIG. 2, showing the position of aircraft during a taxiing operation and a containment area according to another aspect of the present invention.
Figure 6B:
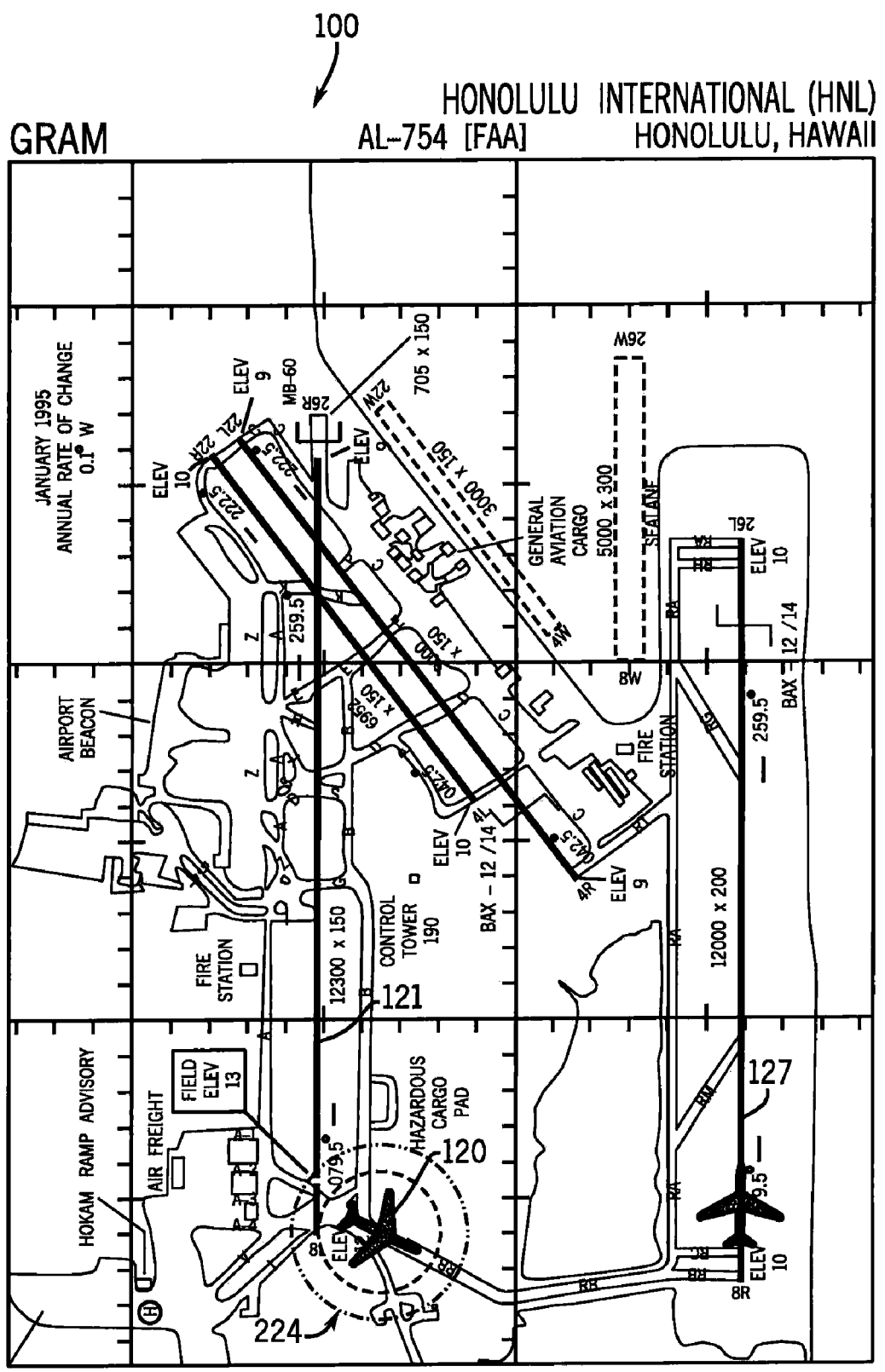
FIG. 6B is the airport chart of FIG. 2, showing one of the aircraft of FIG. 6A in a different location.

As shown in FIGS. 6A-6B, the present position of the aircraft 120 is displayed on the airport chart 100 relative to a number of geographical items of interest. Geographical items of interest include an intended departure runway 121, a taxiway 122, other runways 126, 127, a runway intersection 128, a helipad (not shown), and the like. The processor 40 obtains information regarding the airport chart 100 and geographical items of interest specific to the airport chart 100 from the database 30 as previously discussed. The processor 40 further obtains information regarding the present position, speed, track and/or heading of the aircraft 120 from the positioning system 50. The positioning system 50 may provide further information to the processor 40 such as the operator-selected departure runway 121 and real time aircraft parameters including fuel flow, throttle settings, and the like.

Based on information received from the positioning system 50, the processor 40 defines a containment area 224 that encompasses the aircraft 120 and an area surrounding the aircraft 120. According to the embodiment shown, containment area 224 is comprised of an inner containment area 225 defined by a first boundary 226 and an outer containment area 227, defined by a second boundary 228. Multiple containment areas with different sizes or shapes provides for the ability to attribute different types of notifications to different types of incursions into the containment areas.

According to the embodiment shown, the containment area 224 is centered about the aircraft 120, extends radially outward therefrom, and moves in unison with the aircraft 120. The size and shape of the containment area 224 may be a function of the aircraft speed or time/distance required to stop the aircraft 120. In other words, the containment area 224 may expand when the speed increases and contract accordingly when the speed decreases. The inner and outer containment areas 225, 227 may expand and contract uniformly (such as by a linear rate), with variable rates, or while maintaining a constant distance between the boundaries 226, 228. The exact configuration necessarily depends on the design parameters required for each application.

Other relevant factors used by the processor 40 in determining the size and shape of the containment area 224 may include whether pre-defined runway incursion risk areas are present, the type of geographical features present, etc. For example, if one of the geographical features is another aircraft 131, the processor 40 may use that aircraft's speed and other parameters obtained via the ADS-B or TCAS systems to modify the containment area 224 accordingly. If the other aircraft 131 is moving towards the aircraft 120, the processor 40 may increase the size of the containment area 224 to give the pilot of the first aircraft 120 more time to react because the other aircraft 131 may not utilize a ground maneuvering system. On the other hand, if the other aircraft 131 is stopped or moving away from the first aircraft 120, no modification to the containment area 224 would be needed.

Figure 7:
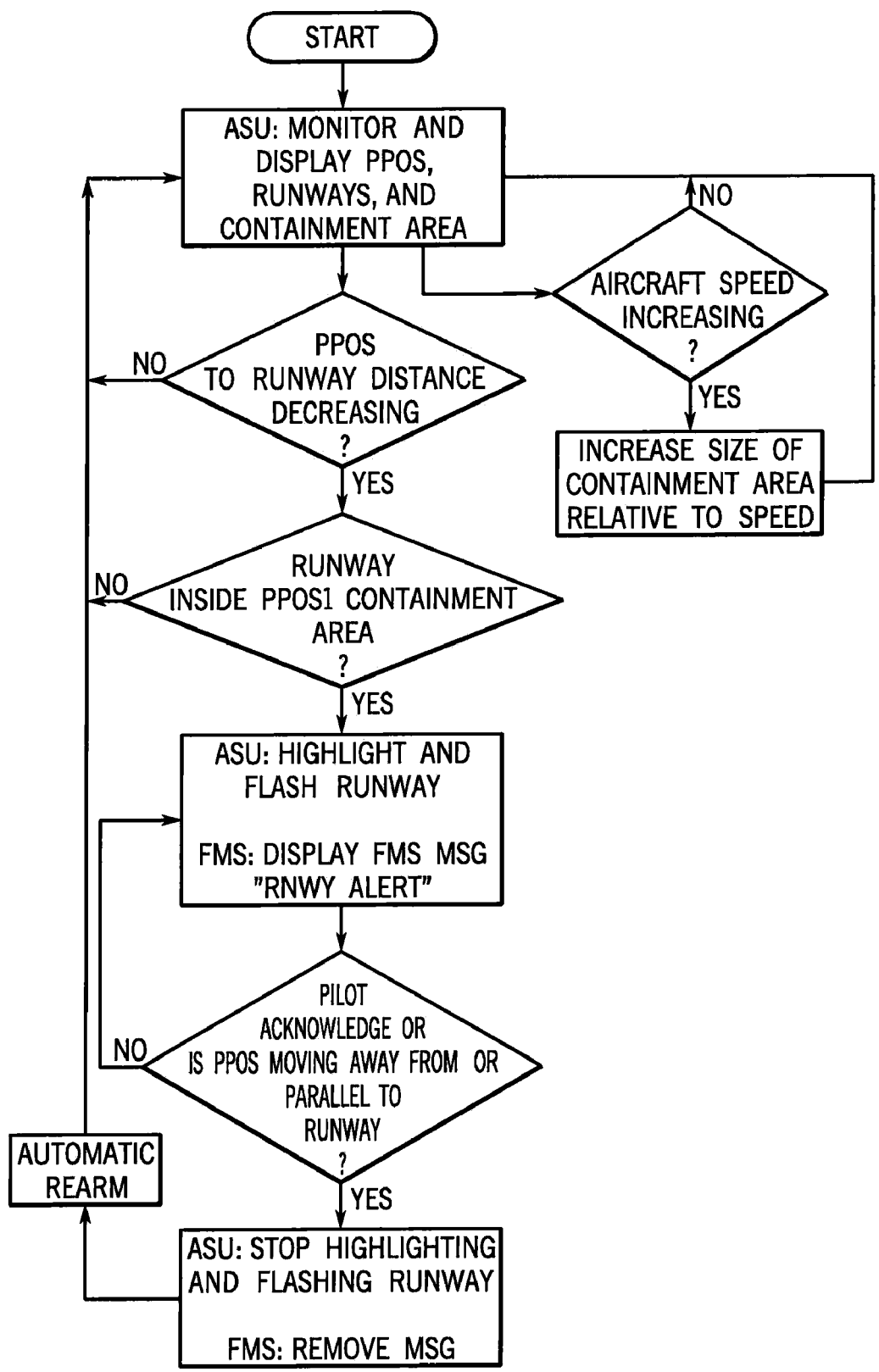
FIG. 7 is a flowchart illustrating features of a method of monitoring potential runway incursions using the containment area of FIGS. 6A-6B in accordance with another aspect of the present invention.
Figure 8:
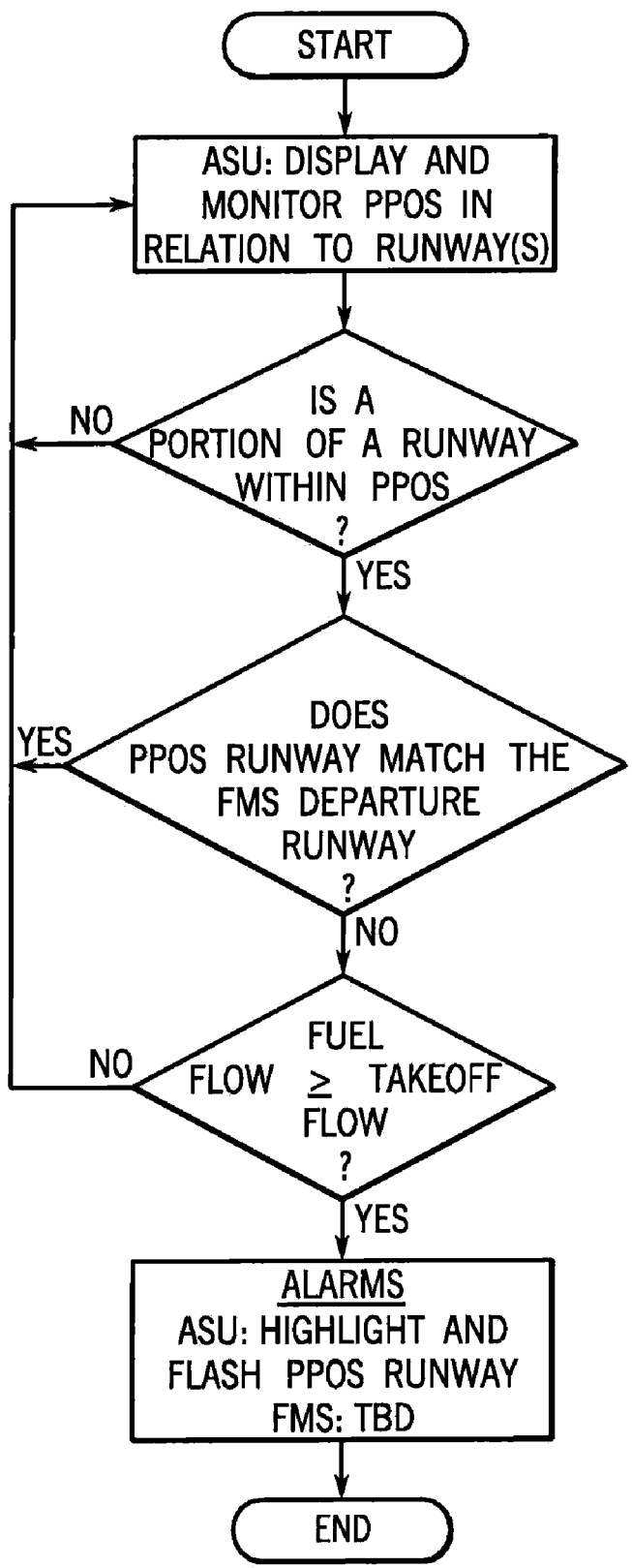
FIG. 8 is a flowchart illustrating features of a method of providing notification if an aircraft is attempting to take off from the wrong runway in accordance with another aspect of the present invention.

In one embodiment, if the aircraft 120 is moving towards a geographical feature of interest, e.g., runway 121, (as determined by the fact that the distance between the runway 121 and aircraft 120 is decreasing) and the runway or other geographical feature of interest becomes at least partially located within the containment area 224, a notification signal routine is initiated by the processor 40. As shown in FIG. 7, a notification signal is transmitted to both the display unit 60 (i.e., a display screen on an ASU unit) and the aircraft's flight management system (FMS) unit. Alternatively, the display unit 60 and FMS unit may regularly poll the processor 40 for notification information and react accordingly. Regardless, some form of notification that a potential runway incursion situation exists (shown in FIG. 6 where at least a portion of the runway 121 is located within the containment area 224) is made to the operator so that the appropriate action may be taken.

In one contemplated visual notification provided by the display unit 60, the runway 121 is highlighted and flashed repeatedly. A message such as "RNWY ALERT" or the like is also displayed on the FMS. An audible notification may also be provided to the operator. As previously described, the operator may acknowledge or disable the notifications even if a portion of the runway 121 is still located within the containment area 224. For example, if the pilot intends to take off from runway 121 and the aircraft 120 is located on that runway, there is no need to continue displaying this notification to the pilot. Once acknowledged or disabled, the processor 40 causes the notifications to cease. The runway 121 shown on display unit 60 is no longer displayed with highlighting or flashing. Alternatively, if the aircraft 120 is moving away from the runway 121 (as shown in FIG. 6B) or parallel to it, for example, if traveling on a taxiway 129 running parallel to the runway 121, the processor 40 may also cause the notifications to cease. After the notification has been acknowledged or disabled, either by the operator or the processor 40, the monitoring system 20 again operates in a standby mode and continues monitoring the containment area 224. Thereafter, if a geographical feature of interest, even the same runway 121, becomes at least partially located within the containment area 224, a new notification is provided to the operator.

Referring now to FIGS. 1, 6A, 6B, and 8, an alternative method of operating an aircraft ground maneuvering monitoring system is disclosed. In this embodiment, the monitoring system 20 tracks, via the positioning system 50, and displays, via the display unit 60, the position of the aircraft 120 relative to the airport chart 100. The positioning system 50 may comprise or be connected to an FMS unit with which an operator selects an intended departure runway 121. The processor 40 obtains this runway information and provides a visual notification, via display unit 60, of the intended departure runway 121. The runway 121 may be displayed in a certain color, e.g., green, or may be indicated in other, readily ascertainable ways.

According to one aspect of this embodiment, processor 40 also receives real-time aircraft parameters including information related to take-off such as fuel flow and throttle settings for the aircraft 120. If the aircraft is on a runway, e.g., runway 127, that is not the intended departure runway, e.g., runway 121, and one or more of the aircraft parameters indicate that the aircraft 120 is in takeoff mode (e.g., a fuel flow greater than or equal to the amount of fuel required for achieving takeoff speeds or other engine performance parameters), a warning message is generated and presented to the operator. In this scenario, for example, the incorrect runway 127 would be highlighted, displayed in red, and flashed in an attempt to warn the pilot. The flight management system unit may also display an appropriate warning message or other type of notification.

Figure 9:
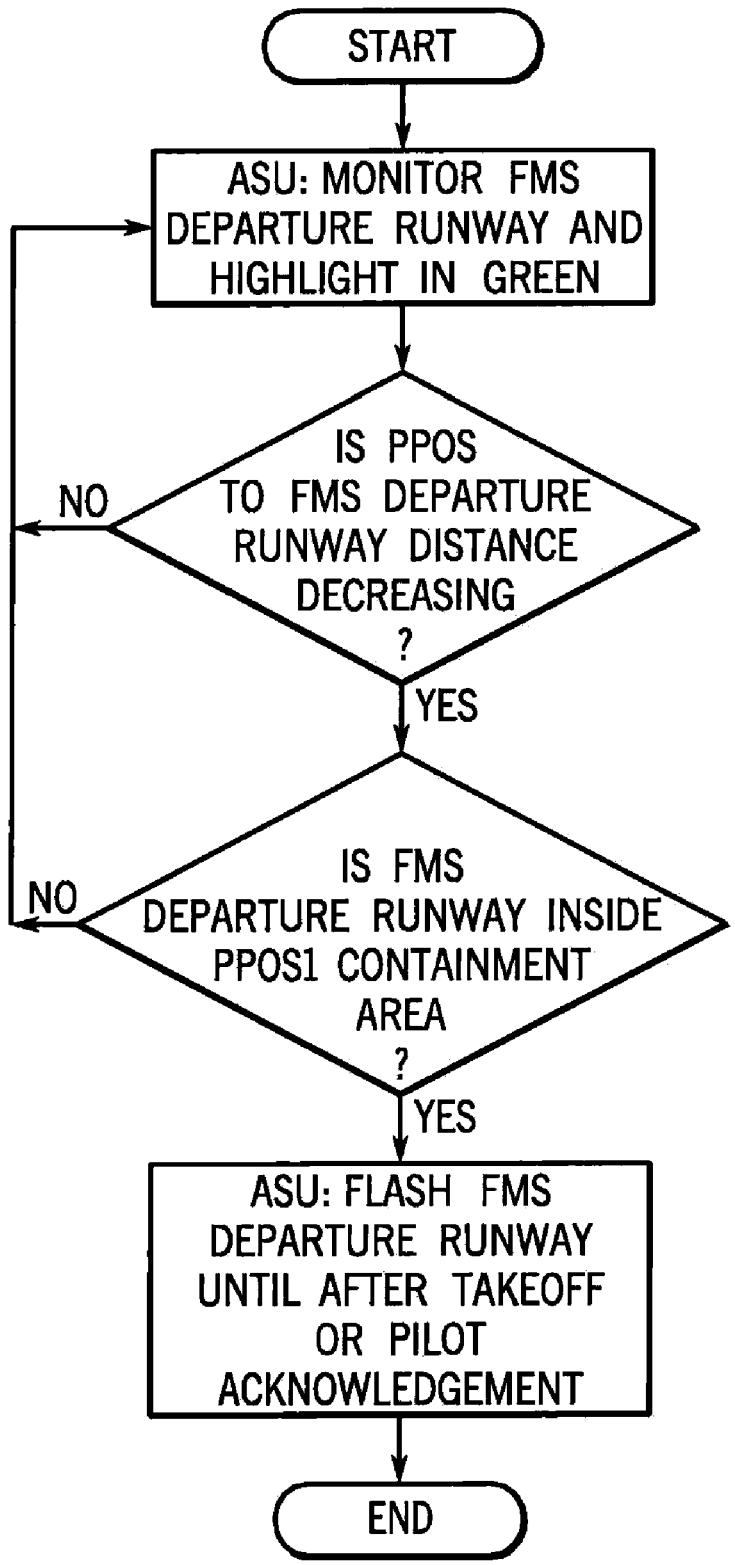
FIG. 9 is a flowchart illustrating features of a method of providing notification of the proper runway to an operator of an aircraft.

In another aspect of this embodiment, shown in FIG. 9, the selected departure runway 121 is highlighted and displayed in green on the display unit 60. If the aircraft 120 is moving towards the departure runway 121, i.e., the distance between the aircraft 120 and runway 121 is decreasing, and a portion of the runway 121 is located within the outer containment area 227, the runway 121 is flashed to indicate that the aircraft 120 is near the selected departure runway 121.

While the embodiments of the invention described herein relate to a system for alerting a pilot to potential runway incursions while engaged in taxiing operations at an airport, the principles of the invention are equally applicable to in-flight operations as well, using geo-referenced approach and/or enroute charts such as those provided by Jeppesen. For example, the geographical feature for which an approach notification is desired could comprise an area of restricted airspace, and a notification could be provided to a pilot when the aircraft enters a containment area corresponding either to a fixed distance surrounding that airspace, a variable distance based on the amount of time which the aircraft would require to reach that airspace, or some combination thereof.

Additionally, while the embodiments of the invention describe herein relate to a monitoring system utilized in connection with an aircraft in the environment of an airport, it is to be understood that the principles of the invention could readily be applied to other vehicles and/or other environments where it would be desirable to provide a notification to the operator of a vehicle that the vehicle is approaching a particular geographical feature or area. The principles of the invention would function equally well in such other environments, provided that the system includes a database having a geo-referenced chart showing the environment in which the vehicle is operating and the specific geographical features or areas of interest, and a display unit capable of displaying the geo-referenced chart and the position of the vehicle thereon.

The foregoing description and drawings merely explain and illustrate the invention, and the invention is not so limited as those skilled in the art who have the disclosure before them will be able to make modifications and variations therein without departing from the scope of the invention.

What is claimed is:

1. A monitoring system for notifying an operator that an aircraft is approaching a geographical feature of interest; the system comprising:

a database containing geo-referenced charts, wherein each geo-referenced chart contains information related to at least one geographical feature of interest;

a processor;

a positioning system configured to identify at least one of the position, heading, track, altitude, and velocity of the aircraft; and a display unit configured to display the geo-referenced airport chart and at least one of the present position of the aircraft and the at least one geographical feature of interest on the chart;

wherein the processor utilizes the at least one of aircraft position, heading, track, altitude, and velocity data from the positioning system to define a containment area always encompassing at least the aircraft and an area surrounding the aircraft, determines whether the at least one geographical feature of interest is at least partially located within the containment area, and initiates a notification signal upon determining that the at least one geographical feature of interest is at least partially located within the containment area;

wherein the notification signal is transmitted to the display unit causing a visual notification to be presented to the operator, and wherein the visual notification ceases upon the aircraft moving parallel to the geographical feature of interest for at least one of a predetermined distance and a predetermined time.

2. The monitoring system of claim 1, further comprising an audible annunciator, wherein the notification signal is transmitted to the audible annunciator causing an audible notification to be presented to the operator.

3. The monitoring system of claim 1, wherein the visual notification comprises a change in display of the at least one geographical feature of interest on the geo-referenced chart.

4. The monitoring system of claim 3, wherein the at least one geographical feature of interest comprises at least one of a runway, a helipad, an intersection, a taxiway, another aircraft, and a restricted airspace.

5. The monitoring system of claim 1, wherein the visual notification comprises a visual identification of the at least one geographical feature of interest at least partially contained within the containment area.

6. The monitoring system of claim 1, wherein the containment area is generally circular in shape and centered about the aircraft.

7. The monitoring system of claim 1, wherein upon determining that the at least one geographical feature of interest is at least partially located within the containment area, the at least one geographical feature of interest is highlighted and flashed on the display unit.

8. The monitoring system of claim 7, wherein the geo-referenced chart is an airport chart and wherein the at least one geographical feature of interest comprises at least one of a runway, a helipad, an intersection, a taxiway, and another aircraft.

9. The monitoring system of claim 1, further comprising an input means configured to permit the aircraft operator to disable the notification signal while the at least one geographical feature of interest is at least partially located within the containment area.

10. The monitoring system of claim 9, wherein if the notification signal is disabled and the at least one geographical feature of interest is no longer at least partially located within the containment area, the processor is reset and a new notification signal is generated if the same or another geographical feature of interest subsequently becomes at least partially located within the containment area.

11. The monitoring system of claim 1, wherein the visual notification ceases when the geographical feature of interest is no longer being at least partially located within the containment area.

12. The monitoring system of claim 1, wherein the containment area is comprised of an inner containment area encompassing at least the aircraft and an outer containment area encompassing at least the aircraft and the inner containment area.

13. A monitoring system for notifying an operator that an aircraft is approaching a geographical area of interest, the system comprising:
a database including geo-referenced airport chart data, wherein the airport chart data includes information on runways from a plurality of airports;
a processor;
a positioning system configured to identify the position and velocity of the aircraft; and
wherein the processor defines a containment area that always encompasses the aircraft wherein the size of the containment area is a function of the velocity of the aircraft, determines whether the a runway is at least partially located within the containment area, and initiates an operator notification signal upon determining that the runway is at least partially located within the containment area, and wherein the processor further determines whether the distance from the aircraft to the runway is decreasing.

14. The monitoring system of claim 13, wherein a notification message is generated if the runway is at least partially located within the containment area and the distance between the aircraft and the runway is decreasing.

15. The monitoring system of claim 14, further comprising a display unit; wherein the notification message is transmitted to the display unit, causing a visual notification to be displayed on the display unit.

16. The monitoring system of claim 15, wherein the visual notification comprises a change in the display of the runway on the geo-referenced chart.

17. A monitoring system for notifying an operator that an aircraft is approaching a geographical area of interest, the system comprising:
a database including geo-referenced airport chart data, wherein the airport chart data includes information on runways from a plurality of airports;
a processor;
a positioning system configured to identify the position and velocity of the aircraft; and
wherein the processor defines a containment area that always encompasses the aircraft wherein the size of the containment area is a function of the velocity of the aircraft, determines whether the a runway is at least partially located within the containment area, and initiates an operator notification signal upon determining that the runway is at least partially located within the containment area, and wherein operator selected departure runway information is received by the processor;
further comprising a display unit, that displays the selected departure runway.

18. A monitoring system for notifying an operator that an aircraft is approaching a geographical area of interest, the system comprising:
a database including geo-referenced airport chart data, wherein the airport chart data includes information on runways from a plurality of airports;
a processor;
a positioning system configured to identify the position and velocity of the aircraft; and
wherein the processor defines a containment area that always encompasses the aircraft wherein the size of the containment area is a function of the velocity of the aircraft, determines whether the a runway is at least partially located within the containment area, and initiates an operator notification signal upon determining that the runway is at least partially located within the containment area, and wherein the processor receives information about aircraft parameters including at least one of fuel flow, throttle settings, engine power settings, and engine RPM.

19. The monitoring system of claim 18, wherein operator selected departure runway information is received by the processor, and the processor generates a unique notification signal if it is determined that the aircraft is not on the selected departure runway and at least one of the aircraft parameters indicate that the aircraft is in takeoff mode.

20. The monitoring system of claim 19, wherein the notification signal is transmitted to the display unit, causing a visual notification comprised of at least one of: flashing the aircraft and flashing the current runway.

21. A method for notifying an operator that an aircraft is approaching a geographical feature of interest, the method comprising:
retrieving a geo-referenced chart and containment area data from a database;
displaying the geo-referenced chart on a display unit;
determining at least one of position, heading, track, and velocity of the aircraft;
transmitting data corresponding to at least one of the position, heading, track, and velocity of the aircraft to a processor;
displaying visual indicia corresponding to least one of the position, heading, track, and velocity of the aircraft on the geo-referenced chart;
defining a containment area that has a fixed positional relationship to the aircraft;
determining whether a geographical feature of interest is at least partially located within the containment area; and
upon determining that a geographical feature of interest is at least partially located within a containment area, providing a visible notification to the operator.

22. The method of claim 21, wherein the visible notification comprises a change in display of a geographical feature of interest on the geo-referenced chart.

23. The method of claim 22, wherein the visible notification comprises an identification of a geographical feature of interest corresponding to the containment area.

24. The method of claim 21, further comprising providing an audible notification to the operator when a geographical feature of interest is at least partially located within a containment area.

25. The method of claim 21, wherein defining a containment area provides a containment area that surrounds the aircraft.

26. The method of claim 21, wherein providing a visible notification to the operator is initiated upon determining that a geographical feature of interest is at least partially located within a containment area.

* * * * *